United States Patent [19]
Palmaer et al.

[11] Patent Number: 5,706,934
[45] Date of Patent: Jan. 13, 1998

[54] MODULAR SOLID TOP PLASTIC CONVEYOR BELT

[75] Inventors: Eric K. Palmaer, Gold River; Karl V. Palmaer, Rancho Murieta, both of Calif.

[73] Assignee: KVP Systems, Inc., Rancho Cordova, Calif.

[21] Appl. No.: 339,131

[22] Filed: Nov. 14, 1994

[51] Int. Cl.$^6$ .................................................. B65G 17/06
[52] U.S. Cl. ................................... 198/853; 198/840
[58] Field of Search ........................ 198/834, 840, 198/853

[56] References Cited

U.S. PATENT DOCUMENTS

| | | | |
|---|---|---|---|
| 3,853,016 | 12/1974 | Lane et al. | 198/834 |
| 4,406,036 | 9/1983 | Nijhvis | 198/853 |
| 4,576,277 | 3/1986 | Park et al. | 198/853 |
| 4,676,368 | 6/1987 | Damkjar | 198/853 |
| 4,688,670 | 8/1987 | Lapeyre | 198/853 |
| 4,729,469 | 3/1988 | Lapeyre et al. | 198/834 |
| 4,925,016 | 5/1990 | Lapeyre . | |
| 5,083,659 | 1/1992 | Bode et al. | 198/853 |
| 5,123,524 | 6/1992 | Lapeyre | 198/853 |
| 5,156,264 | 10/1992 | Lapeyre | 198/853 |
| 5,339,946 | 8/1994 | Faulkner . | |

*Primary Examiner*—Joseph E. Valenza
*Attorney, Agent, or Firm*—Thomas M. Freiburger

[57] ABSTRACT

A modular plastic conveyor belt of heavy duty construction has a solid top with closely fitted together interdigited link ends or projections on the modules for minimizing dropping of particles, liquids, etc. from conveyed objects through the belt. The link ends extending in both directions from the belt are sharply tapered, generally triangular in shape so as to expose large gaps between the link ends and a large proportion of each connecting rod when the belt modules travel around a sprocket, making the gaps and the connecting rods more easily cleaned. The spacing between adjacent link ends is wide, minimizing the number of link ends and thus the number of gaps for cleaning. In addition, the link ends and the connecting rods are relatively heavy in dimension, providing for high tensile strength in the conveyor belt. The belt is driven by engagement of sprocket teeth between the generally cylindrical barrels of the link ends, at the underside of each module. Protruding nipples may be included on the underside of the modules, for tracking the belt against lateral movement.

14 Claims, 4 Drawing Sheets

MODULAR SOLID TOP PLASTIC CONVEYOR BELT

BACKGROUND OF THE INVENTION

The invention is concerned with conveyor belts, particularly plastic modular conveyor belts used primarily in the food industry.

Solid top modular plastic conveyor belts are well known, often used in the food industry for meats, fish or other products which drip or tend to drop crumbs or particles. The plastic modules typically are formed by injection molding and include link ends extending in opposite directions, both forward and rearward, in parallel rows with aligned holes. The link ends are spaced apart so as to be interdigited together and secured by connecting rods in hinged connections or pivot junctures.

A modular plastic conveyor belt of this type is shown in U.S. Pat. No. 4,925,016. Solid top belts of this type have link ends of a shape which tapers in width from top to bottom, so that, although the top of the belt can present a smooth, flat surface with very small gaps at the interdigited connection of the link ends, the link ends are spaced apart at the bottom of the belt, and gaps also open up when the belt travels around a sprocket, bending the pivot junctures. This provides the ability to clean the gaps between the link ends, particularly important in the food industry. Steam or hot water, which may include cleaning agents and disinfectants, can be used to clean the spaces between link ends as the belt travels over a sprocket and changes direction. In some cases cleaning is effected on the return portion of the belt from the reverse side. In each module, the link ends of at least one row are tapered for this purpose, with the top surface of each link end essentially being rectangular so as to fill in a rectangular gap formed by interdigited link ends of the next module. When the pivot junctures flex to an angular configuration, gaps open up between the link ends, exposing the connecting rod to some extent.

Another solid top belt of this general type is sold under the product designation MP84T by Falcon Belting, Inc. of Oklahoma City, Okla. Those belt modules, however, each have one row of link ends which are not tapered, but fit between tapered link ends of a succeeding module.

Solid top belts of this general type have not provided a high strength solid top plastic conveyor belt with highly expensed and opened joints in flexing of the belt over sprockets, while at the same time addressing the problem of minimizing the number of gaps into which food and other particles can be trapped.

SUMMARY OF THE INVENTION

A heavy duty solid top plastic modular conveyor of the present invention has tapered link ends preferably in both the forward and rearward rows. These link ends are of a fairly substantial taper such that relatively large gaps are opened when the belt flexes at pivot junctures, traveling over a sprocket such that the successive modules assume an angular relationship. The connecting rod is exposed more than in the prior art, so that the link end interior surfaces and the connecting rod can be conveniently cleaned as the belt travels over a sprocket. Also, the substantial taper on each of the link ends establishes wide tapered gaps between the link ends on the reverse side of the belt, making thorough cleaning of the link ends and connecting rod easily accomplished on the return side of the belt, from the reverse side.

Each of the link ends preferably is generally triangular as viewed in the plane of the conveyor belt, looking in a forward or rearward direction. The top surfaces of the link ends are essentially coplanar with the solid top belt, in the case of a flat surfaced belt, and are generally rectangular as viewed in a top view so that each rectangle appears to fill a rectangular void of an adjacent module, in the interdigited relationship. The tapered, generally triangular shape of each link end is actually truncated at the bottom of the link end, but the bottom of the link end is quite narrow. Preferably, each link end has a bottom edge width which is about one-fourth inch narrower than the top surface of the link. As an example, one link end might taper from about 0.44 inch at the top of the link end down to about 0.19 inch at the bottom edge. In a preferred embodiment, the link ends vary in width, but each still has an overall taper of at least about 0.25 inch. The taper of all link ends is substantially at the same angle. Each link end preferably is symmetrical, in having a similar angularity on both left and right sides. That angularity is such as to result in the approximately 0.25 inch reduction of width from top to bottom, over a link end height of about 0.62 inch. The angled side faces of the link ends may be inwardly concave to a small degree.

This taper assures that the link ends at the reverse side of the interdigited belt will be at least about 0.25 inch apart at the gap between bottom edges. This compares to gaps of about 0.13 to 0.19 inch in previous belts of this general type. At the top surface of the belt are small gaps at left and right of each link end, within the manufacturing tolerances of the injection molding process, but in any event less than 1/32 inch at each side of each link end.

The solid top belt of the invention is driven by sprockets which have curved driving notches to engage the generally half-circular depending portions of the link ends on the underside of the belt. For tracking the belt laterally, pairs of nipples projecting bosses preferably are provided on the underside of the central deck structure of the belt. These nipples have rounded or tapered ends, and are arranged in pairs with the spacing off each pair being such as to receive the width of the sprocket between the nipples. As noted above, the link ends preferably, vary in width, and they may include three or four different widths. It is preferable that the link ends of the heaviest width be positioned adjacent to tracking nipples, so that the sprockets engage against these heaviest-gauge link ends in driving the belt.

In preferred embodiments the plastic belt modules of the invention do not have the link ends positioned at spacings to make the belt modules suitable for bricklaying, as that term defined in Lapeyre U.S. Pat. Nos. 3,870,141, 4,886,158 and 4,934,518. Instead of bricklaying as defined in those patents, the modules of the invention have half-width link ends at the ends of one row of link ends on a module. This allows mating against another plastic module arranged side-to-side, with the two half-width link ends forming the width of a single link end which will fit into a recess or space between link ends of a succeeding module. Modules are staggered such that joints between adjacent side-by-side modules are offset from any joints in a succeeding row of modules. The use of half-width link ends in this type of staggered arrangement is shown in previous patents of KVP Systems, Inc. such as U.S. Pat. Nos. 4,742,907 and 5,181,601.

Another important feature of the invention is the minimization of the number of link ends across a module, and consequently the number of gaps between interdigited link ends, where food particles and debris can accumulate. The modules of the invention have link ends at relatively widely spacings, greater than 0.75 inch on centers, and more preferably at least 0.875 inch on centers. It is most preferred that the link end spacing is at least about one inch on centers.

This produces correspondingly fewer gaps for cleaning across the width of a conveyor belt, and compares to, for example, a spacing of about 0.625 inch for a typical prior conveyor belt of this general type. In the prior art there was a general trend toward closer spacing of link ends in order to minimize local shear between the link ends and connecting rods. The invention rejects this conventional approach, but at the same time, preferred embodiments are designed for heavy duty conveyor applications. In a two-inch pitch belt (two inches between centers of link end rows in a module), a solid top, flat-topped heavy duty belt formed of injection molded acetal, polypropylene, polyethylene, or nylon has a deck thickness of preferably at least about 0.25 inch. The link ends are heavy and high in tensile strength. In addition, the link end openings and the connecting rods for the modules are larger than what is typical for belts of this general type, with the rod preferably being at least about 0.31 inch diameter. The rod may be formed of the same material as the modules.

In another embodiment of the invention the tops of the conveyor belt modules are curved or arched, preferably defining an arc of a circle from front to back of the module. The circular arc is of a radius such that, when the solid top conveyor travels over a driving sprocket and changes direction, an essentially circular/cylindrical surface is formed by the belt around the sprocket. This enables efficient transfer of products from the conveyor to a further conveyor or to other process areas, using a simple transfer platform positioned close to the surface of the curved tops of the belts.

It has been found in tests of conveyor belts employing the principles of the invention, i.e. with widely spaced link ends and link end configurations as described above, that a 25% increase in belt cleaning efficiency and effectiveness is realized. This reflects, in hot water/disinfectant cleaning, the need for less cleaning water and disinfecting chemicals as well as more thorough cleaning of the connecting rods and gaps between link ends. The belt can be effectively cleaned in place, while the belt is in use with its top surface conveying products.

It is therefore among the objects of the invention to improve the cleanability and cleaning efficiency of a solid top plastic conveyor belt, while at the same time providing a belt of relatively high strength. These and other objects, advantages and features of the invention will be apparent from the following description of a preferred embodiment, considered along with the accompanying drawings.

DESCRIPTION OF PREFERRED
EMBODIMENTS

Figure 1:
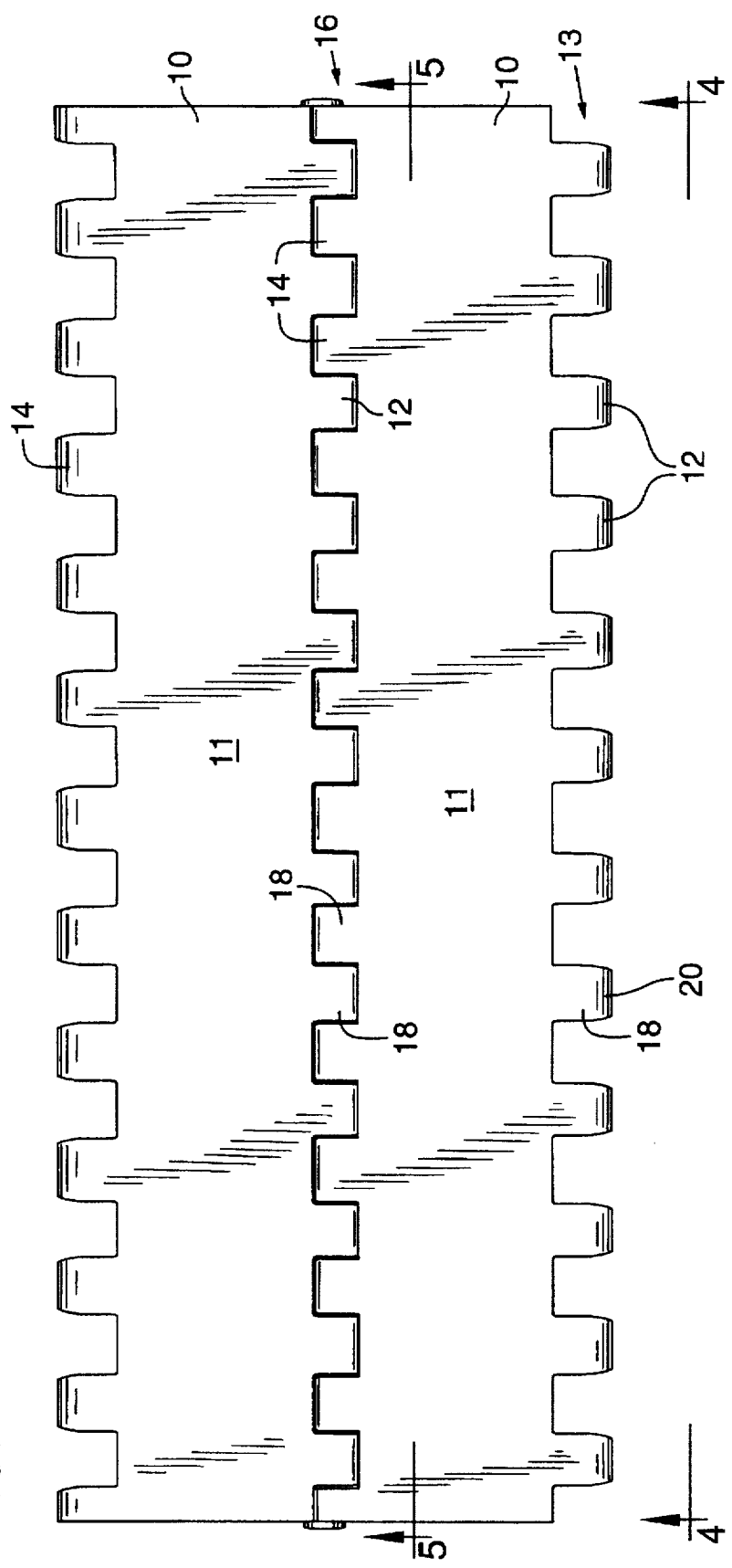
FIG. 1 is a top plan view showing a pair of connected, interdigited solid top conveyor belt modules, forming a part of a conveyor belt in accordance with the invention.

In the drawings, FIG. 1 shows in plan view a pair of plastic conveyor belt modules 10 constructed in accordance with the principles of the invention. Each of the modules 10 has a central deck structure 11 and a series of link ends or projections 12 in one row 13 and another series of link ends or projections 14 in a second row 16. The rows of link ends 13 and 16 may be referred to herein and in the claims as a forward row of link ends and a rearward row of link ends, but the belt in preferred embodiments can be driven in either direction and these terms are used simply as a means of differentiating the two rows of link ends and the opposed directions in which they extend.

The top surface of the central deck structure 11 can be flat topped, in one embodiment, or curved from front to back of the module as discussed below relative to FIG. 7. The surface preferably is solid, but could be perforated for drainage. In any event, the projections 12 and 14 are essentially flush with and coextensive with the upper surface of the deck structure 11, such that the top surface of the deck 11 extends smoothly and integrally into the top surface of the projections 12 and 14. Each link end or projection 12, 14 has an essentially rectangular top surface portion 18, which fills a void of substantially the same size formed between projections of the succeeding module, in the interdigited juncture of modules as shown in FIG. 1. Beyond this rectangular top surface area 18 is a tapered region 20 of each link end, as seen in the plan view of FIG. 1. The link ends actually taper continuously from top to bottom in a preferred embodiment, and this is best seen in the view of FIG. 4.

Figure 4:
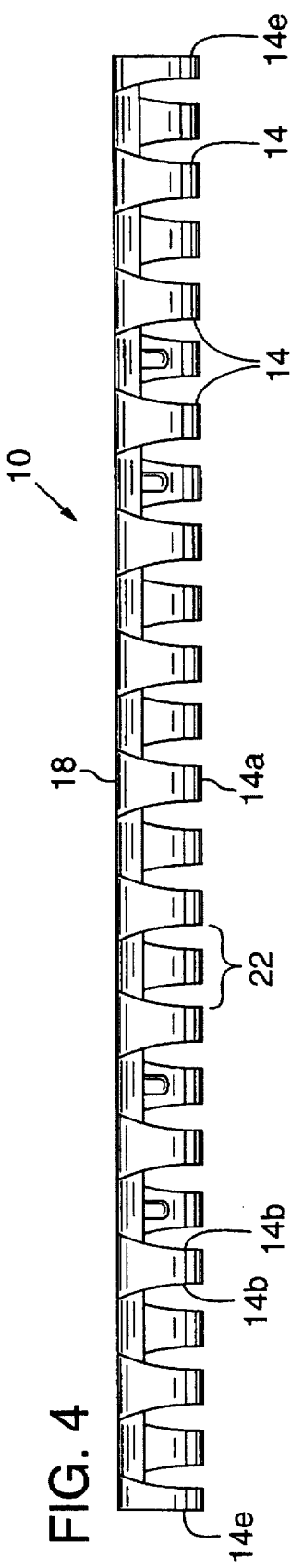
FIG. 4 is a view looking in the direction of conveyor belt movement, generally as seen along the line 4—4 in FIG. 1, showing the shape of link ends of a belt module of the invention.

FIG. 4 shows an end view of a module, looking forward towards the direction of conveyor belt travel. For clarity, the link ends 14 of one row are shown, but the link ends 12 beyond are omitted. The drawing shows that each of the link ends 14 is generally triangular in shape, although truncated at a bottom edge 14a as shown. Also, the link ends 14 may have sides 14b which are slightly concave as shown in the drawing. The term "generally triangular" as used here and in the appended claims is intended to describe the shape shown in FIG. 4, with a relatively strong taper from the generally rectangular top surface 18 of the link end, which is of maximum width, down to the narrowest width at the bottom edge 14a, and with smoothly transitioning sides.

Outermost link ends 14e are of half-width as discussed above, so that when abutted against another module side-by-side, two links ends 14e form a full-width link end for interdigiting in an opening between link ends such as the opening 22 shown in FIG. 4.

Figure 3:
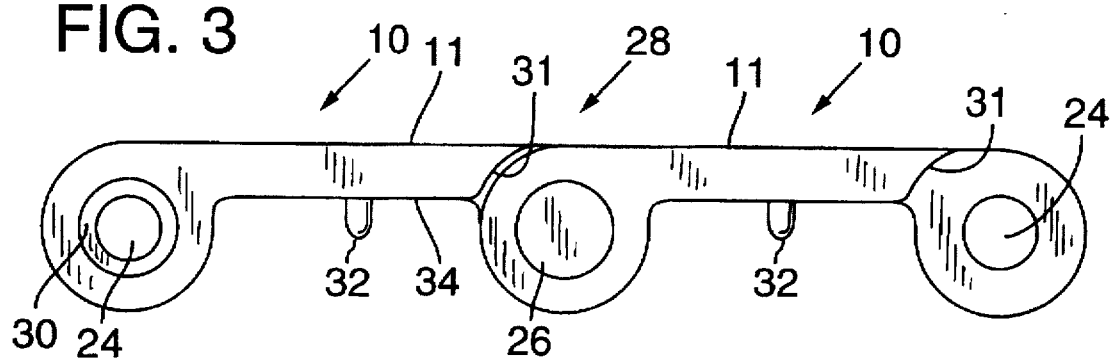
FIG. 3 is a side view showing two solid top modules of the invention connected together, the modules having flat tops.

The link ends 14 and 12 are rounded, essentially circular in shape as shown in FIG. 3. FIG. 3 shows aligned link end openings 24 to receive a connecting rod, and a connecting rod 26 is shown at the juncture or hinge line 28 between the two modules 10 in FIG. 3. As shown at the left side of FIG. 3, the link end opening 24 in the outermost link end has a recess 30 for receiving and seating the enlarged rod head 26 in one preferred embodiment. FIG. 3 also shows that the forward and rear edges 31 of the deck structure, between and adjacent to link ends, are angled, or more preferably curved, to nest closely to link ends of succeeding modules.

Figure 5:
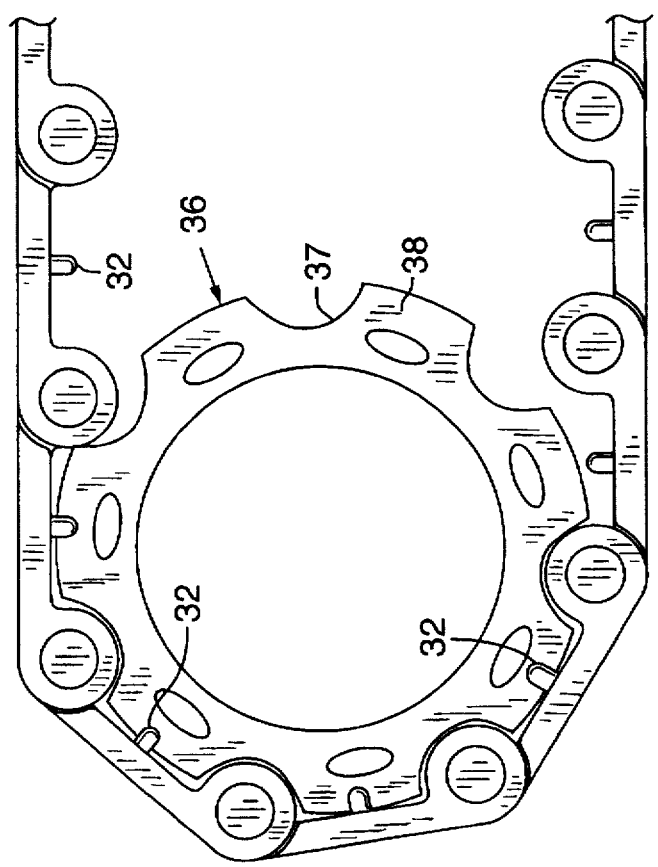
FIG. 5 is a side view indicating a portion of a conveyor belt of the invention traveling around a driving sprocket.

FIG. 3 also shows nipples or protruding bosses 32 which extend downwardly from the bottom surface 34 of the central deck structure of each module. These nipples or bosses 32 are pairs as shown in the bottom plan view of FIG. 2. These nipples, as shown in the side view of FIG. 5, provide a means of tracking the belt over sprockets 36. The sprocket 36 fits between pairs of nipples 32 and the nipples are preferably slightly rounded or tapered so that as they engage the sprocket, they cause the belt to remain on track. The belt may be driven by sockets 37 and teeth 38 engaging the link ends and recesses between them, as indicated.

Figure 2:
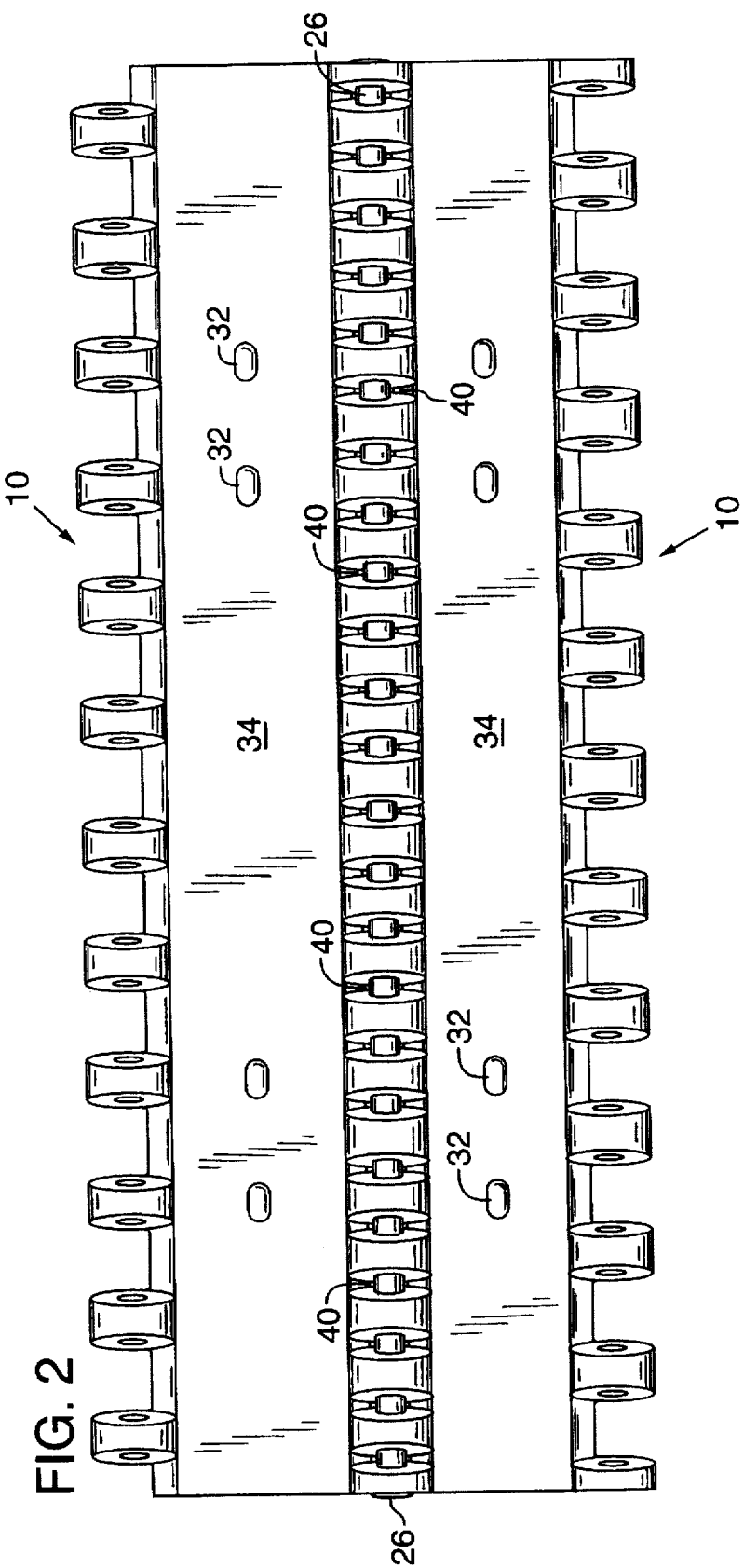
FIG. 2 is a bottom plan view showing the two connected modules of FIG. 1.

As can be seen in FIGS. 1, 2 and 4, the link ends 12 may vary in width, as may the link ends 14. The spacings between link ends also vary, to accommodate link ends of another module, which may be staggered in position laterally. Preferably there is a pattern of repetition of series of link end sizes down the module, to facilitate such staggered connection. In any event, in a belt for heavy duty service, the largest of the link ends in one preferred embodiment, for a link end height of about 0.56 inch, may vary from a top width of about 0.53 inch (bottom link width about 0.28 inch), in a link end of widest dimension, down to a top width of about 0.47 inch (bottom of link width about 0.22 inch) for a narrowest link end. This excludes the half-width link ends 14e as discussed above.

FIG. 2 shows the bottom reverse surface of a pair of interconnected, interdigited belt modules 10 according to the invention. As shown in this view, the bottom edges of the link ends are widely spaced apart, each spacing being at least about 0.25 inch in a preferred embodiment. FIG. 2 shows the very large percentage of the connecting rod 26 which is exposed for cleaning from the reverse side of the belt. The belt is thus very open for cleaning of spaces between link ends and of the connecting rod from this reverse side. In FIG. 2 the rod 26 is shown broken at right, indicating the belt can be wider (but with modules preferably staggered).

FIG. 2 also indicates the narrow gaps 40 which are at the top side of the belt, between adjacent link ends, and which are visible from the reverse side.

Figure 6:
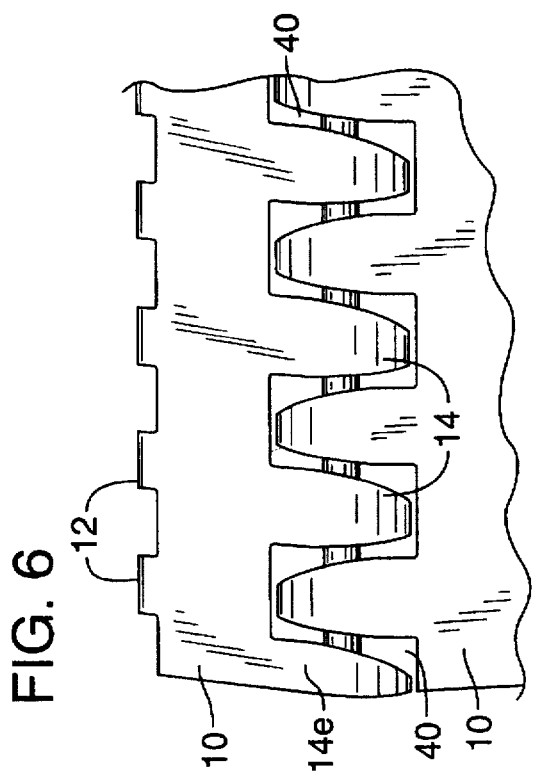
FIG. 6 is a plan view showing portions of two connected modules in angled relationship as occurs over a sprocket.

FIG. 6 shows a pair of the interconnected, interdigited modules 10 as they would appear when bending through an angle which might be encountered in traveling over a sprocket, such as the sprocket 36 shown in FIG. 5. In FIG. 6 a portion of the width of a module is shown, indicating the opening of the gaps 40 (see FIG. 2) to a much wider dimension. As discussed above, this provides gaps considerably larger than the case of most prior art, enabling cleaning of the gaps from adjacent to the sprocket, and including cleaning of the connecting rod. The shaping of both forward and rearward link ends 12 and 14 in the generally triangular shape described above aids in opening these wide gaps, and another important feature, also discussed above, is the minimization of the number of link ends per width of belt, which provides less hinge area to clean per width of belt.

Figure 7:
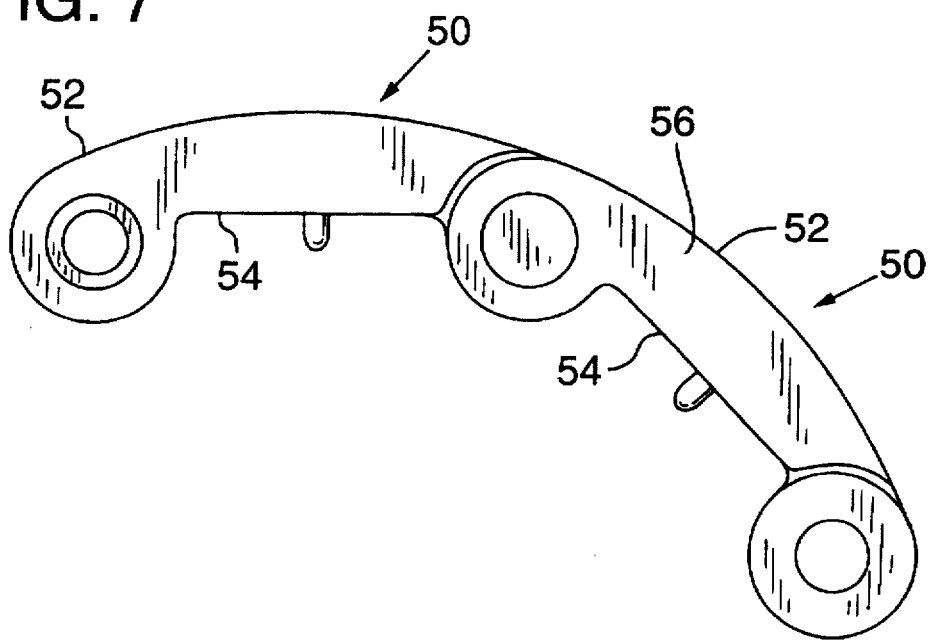
FIG. 7 is a side view showing a pair of interconnected modules following the principles of the invention but in an alternative embodiment wherein the tops of the modules are curved.

FIG. 7 shows a somewhat modified form of the invention, comprising modules 50 which have arched or curved top surfaces 52 rather than the flat tops described above. These modules are interconnected in the same way as described above, and are similar in nearly all respects to the belt modules 10, with the exception of the arched upper surfaces. The arched surface 52 provides an increase in the supporting and impact strength of the module from rod to rod, provided the bottom surface 54 of the module is flat. Thus, the modules 50 are capable of somewhat heavier duty in many cases, or the thickness of the central deck structure 56 of these arched-top modules can be made somewhat thinner to provide strength equal to that of the earlier embodiment described above.

The arched-top modules in FIG. 7 are shown essentially in an angular relationship they would assume in travelling over driving sprocket such as the sprocket 36 shown in FIG. 5. In this configuration the arched top surfaces 52 form an essentially continuous arc of constant radius, so that articles conveyed on the belt can be transferred very conveniently using a blade transfer plate nested closely adjacent to the surfaces 52 at or slightly below the level of the top surface of the belt.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A plastic modular conveyor belt of the type assembled of modules and having a series of interdigited link ends extending in rows in forward and rearward directions from each module and positioned for interdigited connection from module to module, the link ends having aligned transverse openings and being secured at link end junctures by connecting rods passing through the openings in a lateral direction to form the conveyor belt with pivot junctures along the lines of the connected link ends, comprising, each module including a central deck structure between and connecting link ends of the module, comprising a top deck surface essentially flush and coextensive with tops of the link ends, and a bottom surface, the link ends extending downwardly from said top deck surface and below the level of the bottom surface of the central deck structure, so as to define a driving recess between the forward and rearward rows of link ends of a module, the upper side of the recess being defined by the bottom surface of the central deck structure, such that a tooth of a driving sprocket can engage between the rows of link ends below the central portion to drive the belt, and tracking means on the bottom surface of the central deck structure of each module serving only for guiding the belt in a straight path to prevent lateral belt movement.

2. The plastic modular conveyor belt of claim 1, wherein the link ends are at a spacing of at least about 0.875 inch on centers.

3. The plastic modular conveyor belt of claim 1, wherein the link ends are at a spacing of at least about one inch on centers.

4. The plastic modular conveyor belt of claim 1, wherein the pitch of the belt, i.e. the spacing between the link end openings of forward and rearward rows of link ends of a module, is about two inches.

5. The plastic modular conveyor belt of claim 1, wherein said means for tracking the belt comprises at least one nipple extending downwardly from the bottom surface of the central deck structure of each module, positioned for engagement with a sprocket as the module travels around the sprocket.

6. The plastic modular conveyor belt of claim 1, wherein each connecting rod at the pivot junctures of the belt is of plastic and has a diameter of at least about 0.25 inch.

7. The plastic modular conveyor belt of claim 6, wherein each connecting rod has a diameter of at least about 0.31 inch.

8. The plastic modular conveyor belt of claim 1, wherein the central deck structure has a thickness of at least about 0.187 inch, and wherein the pitch of the belt, i.e. the spacing between link end openings of forward and rearward rows of link ends of a module, is about two inches.

9. The plastic modular conveyor belt of claim 1, wherein the generally triangular shape of the link ends includes a truncated surface at said bottom side of each link, and a slight concave curvature on the left and right side of each link end.

10. A plastic modular conveyor belt of the type assembled of modules and having a series of interdigited link ends extending in rows in forward and rearward directions from each module and positioned for interdigited connection from module to module, the link ends having aligned transverse openings and being secured at link end junctures by connecting rods passing through the openings in a lateral direction to form the conveyor belt with pivot junctures along the lines of the connected link ends, comprising,

- each module including a central deck structure between and connecting link ends of the module, comprising an arched top deck surface which is generally arcuate longitudinally through the module and essentially flush and coextensive with tops of the link ends, and the central deck structure having a bottom surface,
- the link ends extending downwardly from said top deck surface and below the level of the bottom surface of the central deck structure, so as to define a driving recess between the forward and rearward rows of link ends of a module, the upper side of the recess being defined by the bottom surface of the central deck structure, such that a tooth of a driving sprocket can engage between the rows of link ends below the central portion to drive the belt, and
- tracking means on the bottom surface of the central deck structure of each module serving only for guiding the belt in a straight path to prevent lateral belt movement.

11. The plastic modular conveyor belt of claim 10, wherein each of the link ends is generally triangular as viewed generally in the plane of the conveyor belt in a forward direction, the link ends having a maximum lateral width at their top surfaces and a minimum lateral width at a bottom side extending below the central deck structure, with the central deck structure having an edge between link ends which slopes inwardly of the module from top to bottom, such that the link ends when interdigited together from module to module form a substantially closed top surface at the pivot junctures but are openly spaced apart at the lower side of the modules, and such that, when the modules travel over a driving sprocket, bending at the pivot junctures, substantial spaces open up between the generally triangular link ends, exposing the connecting rod, facilitating cleaning of the connecting rod and of the spaces between link ends.

12. The plastic modular conveyor belt of claim 1, wherein each of the link ends is generally triangular as viewed generally in the plane of the conveyor belt in a forward direction, the link ends having a maximum lateral width at their top surfaces and a minimum lateral width at a bottom side extending below the central deck structure, with the central deck structure having an edge between link ends which slopes inwardly of the module from top to bottom, such that the link ends when interdigited together from module to module form a substantially closed top surface at the pivot junctures but are openly spaced apart at the lower side of the modules, and such that, when the modules travel over a driving sprocket, bending at the pivot junctures, substantial spaces open up between the generally triangular link ends, exposing the connecting rod, facilitating cleaning of the connecting rod and of the spaces between link ends.

13. A plastic modular conveyor belt of the type assembled of modules and having a series of interdigited link ends extending in rows in forward and rearward directions from each module and positioned for interdigited connection from module to module, the link ends having aligned transverse openings and being secured at link end junctures by connecting rods passim through the openings in a lateral direction to form the conveyor belt with pivot junctures along the lines of the connected link ends, comprising,

- each module including a central deck structure between and connecting link ends of the module, comprising a top deck surface essentially flush and coextensive with tops of the link ends, and a bottom surface,
- the link ends extending downwardly from said top deck surface and below the level of the bottom surface of the central deck structure, so as to define a driving recess between the forward and rearward rows of link ends of a module, the upper side of the recess being defined by the bottom surface of the central deck structure, such that a tooth of a driving sprocket can engage between the rows of link ends below the central portion to drive the belt,
- the link ends being generally triangular as viewed generally in the plane of the conveyor belt in a forward direction, the link ends having a maximum lateral width at their top surfaces and a minimum lateral width at a bottom side extending below the central deck structure, with sides of the link ends smoothly transitioning from said top surface to said bottom side, and with the central deck structure having an edge between link ends which slopes inwardly of the module from top to bottom, such that the link ends when interdigited together from module to module form a substantially closed top surface at the pivot junctures but are openly spaced apart at the lower side of the modules, and such that, when the modules travel over a driving sprocket, bending at the pivot junctures, substantial spaces open up between the generally triangular link ends, exposing the connecting rod, facilitating cleaning of the connecting rod and of the spaces between link ends.

14. The plastic modular conveyor belt of claim 13, wherein the link ends are at spacings of at least about one inch on centers.

* * * * *